Figure 1:
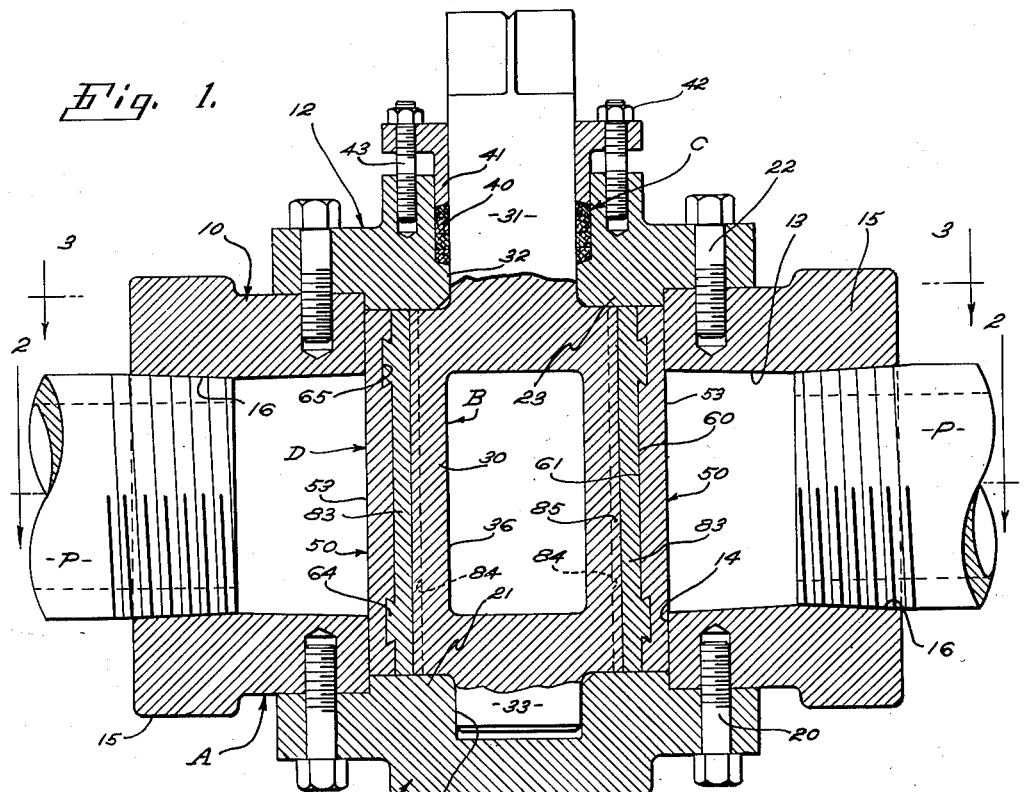

Sept. 2, 1952   J. HEINEN   2,609,174
PLUG VALVE

Filed Feb. 17, 1948   2 SHEETS—SHEET 1

INVENTOR
JOSEPH HEINEN
BY
ATTORNEY

Sept. 2, 1952 J. HEINEN 2,609,174
PLUG VALVE
Filed Feb. 17, 1948 2 SHEETS—SHEET 2
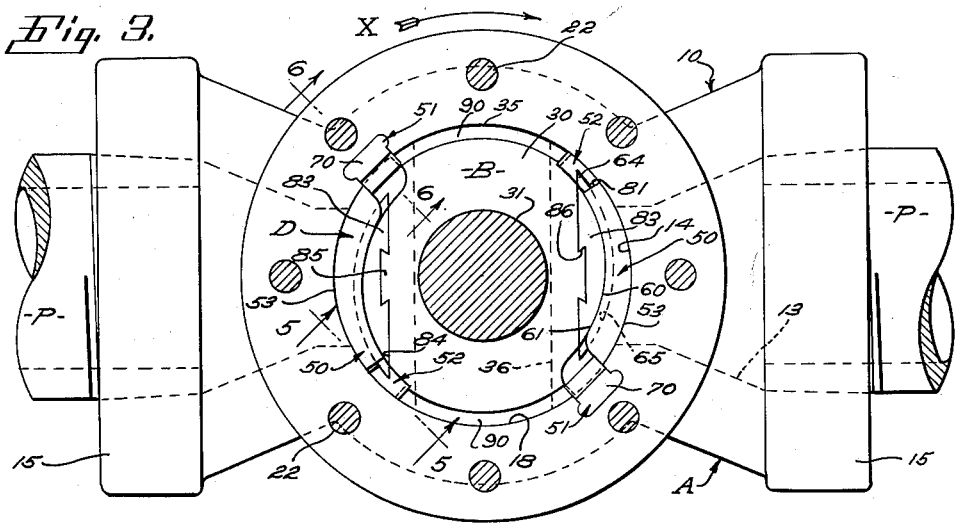
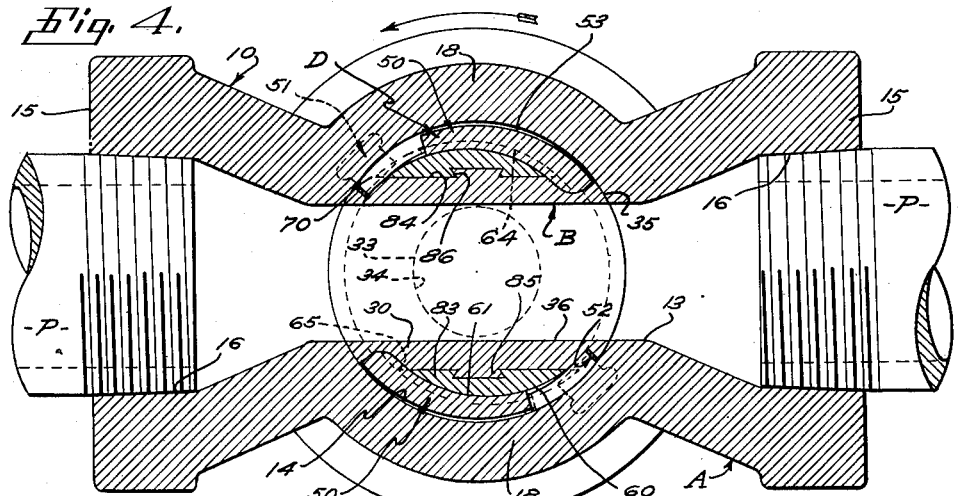
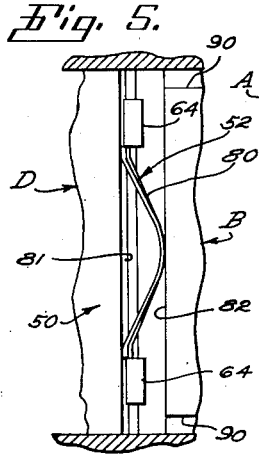
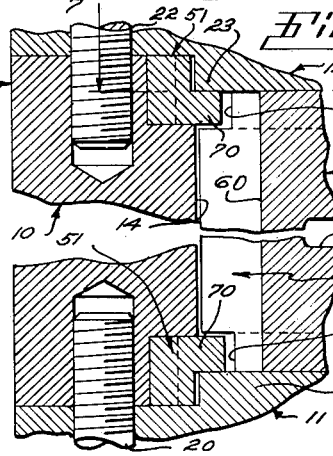
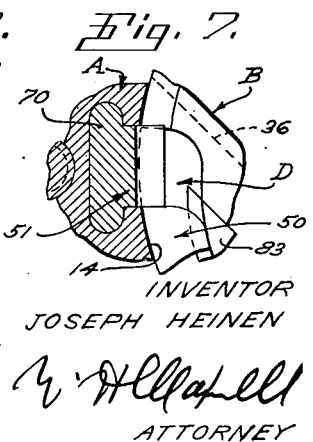
INVENTOR
JOSEPH HEINEN
BY
ATTORNEY Patented Sept. 2, 1952

2,609,174

UNITED STATES PATENT OFFICE 2,609,174

PLUG VALVE

Joseph Heinen, Long Beach, Calif.

Application February 17, 1948, Serial No. 8,860

16 Claims. (Cl. 251—102)

This invention is concerned with a plug valve and it is a general object of the invention to provide such a valve including means whereby a positive dependable seal is established upon the valve being moved to the closed position.

Plug valves are usually characterized by metal to metal engagement between the plug and body and an effort is made to maintain such engagement by employing a tapered plug fitted into a tapered opening in the body. Such structures are somewhat difficult of manufacture and for various reasons are generally not altogether satisfactory. For example when the usual plug is turned in the body the rubbing action that results often causes the surfaces to be scored forming passages through which leakage develops.

Attempts have been made to overcome the leakage characteristic of plug valves by establishing grease seals between the plug and body. Such structures work satisfactorily under limited circumstances. However, under high pressures such as tend to distort the parts, the close metal to metal engagement is lost and the fluids being handled reach the grease or sealing materials causing them to wash out or fail as effective sealing means.

It is a general object of the present invention to provide a plug valve wherein the plug and the plug carrying chamber in the body may be straight and free of taper and wherein the desired sealing engagement is obtained by means of a sealing plate forced into tight sealing engagement as the plug is moved to the fully closed position. With my construction there is no rubbing action to cause scoring of the parts relied upon for sealing engagement and it is possible to use materials that would otherwise be unsuitable.

Another object of the present invention is to provide a structure of the general character referred to wherein a cam means operates the sealing plate and results in tight sealing engagement of the plate even though the structure may be under high pressure causing some distortion such as might otherwise make proper sealing engagement between parts impossible.

Another object of the present invention is to provide a structure of the general character referred to wherein the sealing plate is operated by cam means brought into operation as the plug is turned to its fully closed position making it unnecessary to provide special means or structure for actuating the plate as is the case in structures where the plate is moved lengthwise of the plug in order to effect sealing engagement.

A further object of the present invention is to provide a construction whereby the cam means for actuating the sealing plate may be incorporated in the construction in a most simple practical and economical manner.

Figure 2:
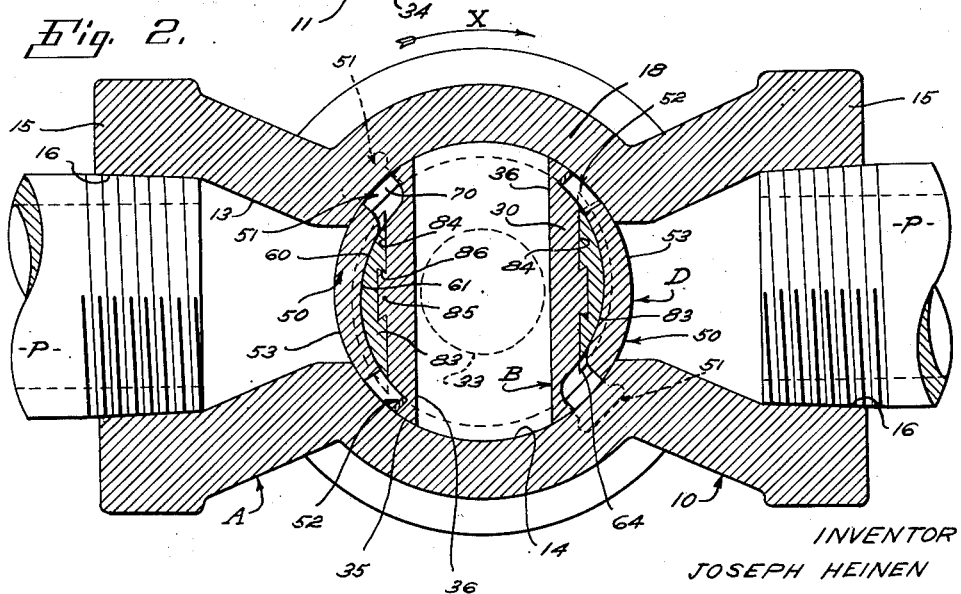

The various objects and features of my invention will be fully understood from the following detailed description of a typical referred form and application of my invention, throughout which description reference is made to the accompanying drawings, in which:

Fig. 1 is a vertical longitudinal detailed sectional view of a plug valve embodying the present invention showing it in a fully closed position. Fig. 2 is a plan section of the structure being a view taken as indicated by line 2—2 on Fig. 1. Fig. 3 is a plan section of the structure taken substantially as indicated by line 3—3 on Fig. 1. Fig. 4 is a view similar to Fig. 2 showing the plug of the structure in the fully open position. Fig. 5 is a detailed view of a portion of the structure being a view taken substantially as indicated by line 5—5 on Fig. 3. Fig. 6 is an enlarged vertical sectional view of a portion of the structure being a view taken as indicated by line 6—6 on Fig. 3, and Fig. 7 is a plan section taken as indicated by line 7—7 on Fig. 6.

The structure including the present invention involves, generally, a body A, a plug B operable in the body, packing means C between the stem of the plug and the body and sealing means D sealing between the plug and the body.

The body A may in practice vary widely in form and construction. However, it is preferred that the body be simple and in the drawings it is shown as including a main section 10, a bottom section 11 and a top section 12.

The main section of the body is shown as an elongate horizontally disposed part having a flow passage 13 extending through it from one end to the other. A plug opening 14 extends vertically through the body section 10 and intersects the flow passage 13 intermediate its ends. The outer or end portions of the flow passage 13 are round in cross-sectional configuration and at the outer end portions 15 the section 10 is provided with coupling means whereby pipe P, or the like, may be joined to the valve. In the particular case illustrated the outer end portions of the flow passage 13 are internally threaded at 16 for the reception of the pipe P, or the like.

In accordance with the preferred form of the invention the flow passage 13 narrows or decreases in width as it progresses inwardly from the threaded end portions 16 and increases in height as it progresses inwardly with the result that the passage is narrow and high or of greater vertical extent than horizontal extent at the points where it intersects or joins the plug opening 14. This formation of flow passage 13 is clearly illustrated in Figs. 1 or 2 of the drawings.

The plug opening 14 extends transversely through the section 10 from one side to the other and as the structure is illustrated it extends between the upper and lower sides. The opening 14 is preferably a round opening, that is, it is round in cross-sectional configuration and is uniform in diameter throughout its length, being a simple bore formed straight through the body section from one side to the other. It is to be noted from Fig. 2 of the drawings that the plug opening 14 is of such diameter relative to the flow passage 13 as to establish wall portions 18 of substantial circumferential extent between the points where the flow passage 13 communicates with the plug opening 14.

The bottom section 11 of the body A is arranged at or applied to the bottom side of the main section 10 to form a closure for the lower end of the plug opening 14. In the case illustrated the section 11 is separable from the main section 10 being joined thereto by releasable fasteners in the form of screw fasteners 20. In the particular case illustrated the section 11 is provided with a round boss 21 that enters the lower end of the plug opening 14 and which serves to centralize or locate the section 11 relative to the section 10.

The top section 12 of the body is located at the top side of the body or main section 10 and like the section 11 it is separable from the section 10. The top section 12 is shown releasably joined to section 10 by suitable screw fasteners 22 and it is shown provided with a round boss 23 which enters the upper end of plug opening 14 to centralize or locate the section 12 relative to section 10.

The plug B occupies the plug opening 14 or the chamber formed in the body A by the opening 14 and it has a body 30 extending between the sections 11 and 12 and a stem 31 projecting from its upper end through opening 32 formed centrally in the section 12. A centering pin or projection 33 depends from the lower end of the plug body 30 into a central socket opening 34 in the body section 11. Through this construction the plug is rotatably supported through or by means of the stem 31 and the centering pin 33. This structure relieves the sealing plates of thrust when the valve is opened under pressure. It is preferred in practice that the exterior 35 of the plug body 30 be turned or formed so that it is round and concentric with the longitudinal axis of the plug and fits the plug opening 14 with working clearance it being unnecessary to provide bearing engagement between the plug body 30 and the wall of the opening 14, as the plug may be supported through the construction above-described.

The plug body 30 is characterized by a flow aperture 36 extending laterally and diametrically through the body 30. The flow aperture 36 of the plug is preferably of such size and shape as to correspond with the flow passage 13 where it intersects the plug opening 14 and the parts are arranged and related so that the flow aperture 36 can be moved into and out of register with the passage 13 as will be apparent from Figs. 2 and 4 of the drawings.

The packing means C may be any suitable means that will serve to pack between the stem of the plug and the body A. In the case illustrated a simple packing means is shown and it involves a body of packing 40 carried in body section 12 and engaged by a follower 41 operated by nuts 42 on studs 43 projecting from the section 12.

The sealing means D provided by the present invention may be located at or confined to one side of the plug body 30 to engage the body or section 10 of the body where one end portion of the flow passage 13 intersects the plug opening 14. It is preferred, however, that there be two units of the means D one at each side of the body 30 so that two seals are established between the plug and the body simultaneously.

The units of means D are preferably alike and each preferably includes a sealing plate 50 which is in effect located in a recess in one side of the plug, cam parts or cam engagement between the plate 50 and the body of the plug, stop means 51 limiting movement of the plate in the body and resilient means 52 normally yieldingly holding the plate 50 in what I will refer to as a collapsed or retracted position on the plug.

The sealing plate 50 is of such vertical extent as to extend above and below the opening 13, in fact, it may extend between the body sections 11 and 12 as shown in the drawings and it is of such circumferential extent as to extend beyond or overlap the vertical edges of the opening 13 when in the closed position such as shown in Fig. 2. In accordance with my invention the outer face 53 of the plate, which is the sealing face of the plate, is cylindrically curved or is curved so that it has the same curvature as the inner wall of the plug opening 14 with the result that a tight continuous metal to metal engagement may be established between the plate and the marginal portion of the wall or opening 14 surrounding the flow passage 13 where it intersects opening 14. It will be apparent that with my construction the sealing face of the plate may be coated or surfaced, as with a sealing member or washer-like part, say for example a sheet of rubber or the like.

The cam engagement provided between the plug and plate involves a cam face 60 on the exterior of the plug and a corresponding cam face 61 at the inner side of the plate. In accordance with my invention the cam surfaces 60 and 61 are curved about a single or common center which is somewhat offset or removed from the central axis of the plug so that as the plate is moved circumferentially of the plug with the cam faces 60 and 61 in engagement with stop 51 the plate is shifted radially of the plug. When the plate is in one extreme position or at one end of its possible movement around the plug as shown in Fig. 4 it is retracted or in the innermost position, whereas, when it is in the position shown in Fig. 2 it is in an out or working position to have sealing engagement with the wall of bore 14 surrounding the flow passage 13.

In accordance with my invention I join the plate to the plug so that the cam surfaces 60 and 61 are maintained in engagement with each other. In the particular case illustrated a rib-like key construction is employed and as shown in the drawings two vertically spaced ribs 64 are provided on the plug extending circumferentially thereof and following the curvature of cam surface 60 and these ribs are slidably received in grooves 65 in the inner side of the plate 50. It is to be noted that the ribs 64 and 65 have dovetailed engagement causing the plate to be maintained in seated engagement on the plug so that cam faces 60 and 61 are always together or engaged.

The stop means 51 serves to limit the extent to which the plate 50 can be moved around in the plug opening 14 in the direction indicated by the arrow X in Fig. 2. In the particular case illustrated the stop means 51 involves vertically spaced stop lugs 70 carried by the main section 10 of the body to project into the plug chamber established by the opening 14. In the particular case illustrated there are two stop lugs 70 for the plate and these are located adjacent the sections 11 and 12 of the body so that the upper and lower end portions of the plate simultaneously engage the stop lugs as the plug is rotated in the direction indicated by the arrow X in Fig 2. The upper and lower peripheral corners of the plug body 30, adjacent the sections 12 and 11, are notched at 90 so that the lugs 70 do not interfere with rotative movement of the plug.

It is to be observed that the eccentricity of the cam surfaces 60 and 61 relative to the central axis of the plug is such that when the plate 50 has engaged stop 51 and has been stopped in the body section 10 opposite the flow passage 13 or where the flow passage intersects the plug opening and rotation of the plug body is continued the cam surfaces 60 and 61 move relative to each other causing the plate 50 to be moving radially outward relative to the plug and into pressure engagement with the wall of opening 14 around the passage 13.

The means 52 serve to normally yieldingly hold the plate 50 positioned relative to the plug where the plate is in the retracted position as shown in Fig. 4. In the particular form of the invention illustrated the means 52 involves a single leaf spring engaging one vertical edge 81 of the plate 50 and bearing on a shoulder 82 extending vertically on the exterior of the plug body 30.

The cam portion of the plug body, that is, the portion of the plug body provided with the cam surface 60 is preferably formed as a section 83 separable from the main portion or body 30 of the plug. This construction is provided mainly to simplify manufacture. In the particular case illustrated the body 30 of the plug is provided with a flat side 84 on which the section 83 is mounted or fixed. In the case illustrated the plug section 83 is fixed in position by means of a longitudinal rib or key 85 projecting from the flat side 84 and engaged in a longitudinal groove or channel 86 in the section 83. The rib 85 and groove 86 extend longitudinally from one end of the plug body 30 to the other and they have dovetailed engagement causing the section 83 to be held tight against the side 84 of the body.

With the construction just described it is simple and economical to form the flat side of the body of the plug with the rib 85 and it is simple to form the section 83 of the plug with the cam surface 60 at its outer side and the groove 86 at its inner side so that when the section 83 is in place on the body 30 the cam surface 60 has the desired eccentricity relative to the central axis of the plug.

From the foregoing description it will be apparent that when employing diametrically opposite sealing plates 50 as shown throughout the drawings the plates are simultaneously operated in opposite direction radially of the plug to positively seal with the body at both sides of the plug. Further it will be apparent that through my construction I do not depend upon maintaining metal to metal contact between a solid or rigid plug and a solid body but rather I provide a plug with parts, namely, the plate 50, which are radially expansible and which expand in response to rotation of the plug so that the plug body need not fit accurately in the body and a seal may be established even though pressures be high and such as to cause slight distortion or expansion of the body.

It is further to be noted that through the construction that I have provided the structure involves few simple easily formed parts and I gain a positive double seal between the plug and the body without resorting to packing, grease seals or other expediences such as are commonly employed in structures of this general character.

Having described only a typical preferred form and apparatus of my invention, I do not wish to be limited or restricted to the specific details herein set forth, but wish to reserve to myself any variations or modifications that may appear to those skilled in the art and fall within the scope of the following claims.

Having described my invention, I claim:

1. A valve including, a body having a flow passage and a plug chamber intersecting the passage, a plug rotatable in the chamber and having a flow aperture movable into and out of register with the passage and having a curved exterior cam surface extending circumferentially of the plug and eccentric thereto, and a sealing plate having a curved cam face at its inner side seated on the cam surface, the said face and surface being of corresponding curvature and cooperating to move the plate radially of the plug into sealing engagement with the wall of the chamber upon rotation of the plug in the body.

2. A valve including, a body having a flow passage and a plug chamber intersecting the passage, a plug rotatable in the chamber and having a flow aperture movable into and out of register with the passage and having a recess in its exterior and between the ends of the aperture, a detachable exterior section on the plug in the recess and having an outer cam surface extending circumferentially of the plug and eccentric thereto, and a sealing plate on the plug actuated by the cam surface of said section into sealing engagement with the wall of the chamber.

3. A valve including, a body having a flow passage and a plug chamber intersecting the passage, a plug rotatable in the chamber and having a flow aperture movable into and out of register with the passage and having a curved external cam surface extending circumferentially of the plug and eccentric thereto, a sealing plate shiftable circumferentially of the plug and having a curved face at its inner side cooperating with the said cam surface, stop means stopping the plate in the body in position to close the passage, the said face and surface cooperating to shift the plate radially of the plug from a retracted position into sealing engagement with the wall of the chamber when the plate is stopped in the body and the plug is rotated therein, and a leaf spring engaging one longitudinal edge of the plate and normally yieldingly holding the plate in a retracted position.

4. A valve including, a body having a flow passage and a plug chamber intersecting the passage, an elongate plug rotatable in the chamber and having a transverse flow opening movable into and out of register with the passage and having an exterior curved cam surface extending circumferentially of the plug and eccentric thereto, a sealing plate extending lengthwise of the plug and shiftable circumferentially of the plug and having an inner curved face cooperating with the said cam surface, stop means stopping the plate in the body in position to close the passage, the said face and surface being of corresponding curvature and cooperating to shift the plate radially of the plug into sealing engagement with the wall of the chamber when the plate is stopped in the body and the plug is rotated therein, and a leaf spring engaging one longitudinal edge of the plate and normally yieldingly holding the plate on the plug retracted from the wall of the chamber.

5. A valve including, a body having a flow passage and a plug chamber intersecting the passage, a plug rotatable in the chamber and having a flow opening movable into and out of register with the passage and having a curved exterior cam surface extending circumferentially of the plug and eccentric thereto, a sealing plate on the plug having a curved face at its inner side substantially coextensive with the inner side of the plate and seating on the cam surface, the said face and surface cooperating to move the plate into sealing engagement with the wall of the chamber upon rotation of the plug in the body, and a rib guiding the plate circumferentially of the plug.

6. A valve including, a body having a flow passage and a plug chamber intersecting the passage, a plug rotatable in the chamber and having a flow opening movable into and out of register with the passage and having a cam surface extending circumferentially of the plug and eccentric thereto, a sealing plate on the plug actuated by the cam surface into sealing engagement with the wall of the chamber, and a rib on the exterior of the plug extending in the direction of the cam surface securing the plate to the plug for movement only along the cam surface of the plug.

7. A valve including, a body having a flow passage and a plug chamber round in cross-section and intersecting the passage, a plug in the chamber including a body with a round portion fitting the plug chamber, said portion having a circumferential recess in one side with a flat bottom, a section seated on the flat bottom and having an outer cam surface, and means coupling the plug body and section against relative movement about the axis of the plug and a plate on the plug engaged by the said cam surface and shiftable radially by said cam surface into sealing engagement with the wall of the chamber.

8. A valve including, a body having a flow passage and a plug chamber round in cross-section and intersecting the passage, a plug in the chamber including a body with a recess in one side, a section seated on said recess of the body and having an outer curved cam surface, and means coupling the plug body and section, and a plate on the plug engaged by the cam surface and shiftable radially by the cam surface into sealing engagement with the wall of the chamber, said means including a key extending longitudinally of the plug.

9. A valve including a body having a flow passage intersected by a plug chamber, a plug rotatable in the chamber and having a flow aperture movable into and out of register with the passage, plates on diametrically opposite sides of the plug shiftable circumferentially of the plug, like sections separate from the plug and arranged at diametrically opposite sides of the plug and behind the plates, and means detachably securing the sections to the plug in fixed position thereon, the sections having cam surfaces operating the plates simultaneously into sealing engagement with the wall of the chamber around the passage upon turning of the plug between the plates.

10. A valve including a body having a flow passage intersected by a plug chamber, a plug rotatable in the chamber and having a body with a flow aperture movable into and out of register with the passage, the body being relieved at one side, a section seated on said side of the body, and a key extending longitudinally of the plug retaining said section on the body, there being a curved cam surface on the exterior of the said section eccentric to the longitudinal axis of the plug, a plate engaging said cam surface and shiftable circumferentially of the plug to be moved radially outward of the plug by said cam surface, a key extending along said cam surface retaining the plate on the plug, and a spring engaging one edge of the plate and normally yieldingly holding the plate in a retracted position.

11. A valve including, a body having a flow passage intersected by an elongate plug chamber, an elongate plug in the chamber concentric therewith and having a portion in the body substantially round in cross section, said portion of the plug having a flow aperture therethrough and having a recess in one side thereof between the ends of said aperture, the plug being rotatable in the body to move the aperture into and out of register with the passage, and means sealing the flow passage when the aperture is out of register with the flow passage including, a plate in the recess and shiftable circumferentially of the plug and having an outer sealing face substantially continuous with the exterior of said portion of the plug, and cam means acting between the plate and plug operable by movement of the plate circumferentially relative to the plug to move the plate radially of the axis of the plug into sealing engagement with the wall of the chamber around the passage where it joins the chamber.

12. A valve including, a body having a flow passage intersected by an elongate plug chamber, an elongate plug in the chamber concentric therewith and having a portion in the body substantially round in cross section, said portion of the plug having a flow aperture therethrough and having a recess in one side thereof between the ends of said aperture, the plug being rotatable in the body to move the aperture into and out of register with the passage, and means sealing the flow passage when the aperture is out of register with the flow passage including, a plate in the recess and shiftable circumferentially of the plug and having an outer sealing face substantially continuous with the exterior of said portion of the plug, means coupling the plate to the plug against displacement therefrom, and cam means acting between the plate and plug operable by movement of the plate circumferentially relative to the plug to move the plate radially of the axis of the plug into sealing engagement with the wall of the chamber around the passage where it joins the chamber.

13. A valve including, a body having a flow passage intersected by an elongate plug chamber, an elongate plug in the chamber concentric therewith and having a portion in the body substantially round in cross section, said portion of the plug having a flow aperture therethrough and having a recess in one side thereof between the ends of said aperture, the plug being rotatable in the body to move the aperture into and out of register with the passage, and means sealing the flow passage when the aperture is out of register with the flow passage including, a plate in the recess and having an outer sealing face substantially continuous with the exterior of said portion of the plug, a key connecting the plate and body for movement of the plate in the recess circumferentially of the body, and cam means acting between the plate and plug operable by movement of the plate circumferentially relative to the plug to move the plate radially of the axis of the plug into sealing engagement with the wall of the chamber around the passage where it joins the chamber.

14. A valve including a body having a flow passage intersected by an elongate plug chamber, an elongate plug in the chamber concentric therewith and having a portion in the body substantially round in cross section, said portion of the plug having a flow aperture therethrough and having a recess in one side thereof between the ends of said aperture, the plug being rotatable in the body to move the aperture into and out of register with the passage, and means sealing the flow passage when the aperture is out of register with the flow passage including, a plate in the recess and shiftable circumferentially of the plug and having an outer sealing face substantially continuous with the exterior of said portion of the plug, means stopping the plate in the body and at the flow passage, and cam means operated by rotation of the plug while the stop means holds the plate at the flow passage and shifting the plate from the plug and into sealing engagement with the wall of the chamber around the passage where it joins the chamber.

15. A valve including, a body having a flow passage intersected by an elongate plug chamber, an elongate plug in the chamber concentric therewith and having a portion in the body substantially round in cross section, said portion of the plug having a flow aperture therethrough and having a recess in one side thereof between the ends of said aperture, the plug being rotatable in the body to move the aperture into and out of register with the passage, and means sealing the flow passage when the aperture is out of register with the flow passage including, a plate in the recess and shiftable circumferentially of the plug and having an outer sealing face substantially continuous with the exterior of said portion of the plug, the bottom of the recess being cam-shaped and engaged by the plate and operating the plate relative to the plug and into sealing engagement with the wall of the chamber around the passage where it joins the chamber when the plate is shifted circumferentially relative to the plug.

16. A valve including, a body having a flow passage and an elongate plug chamber intersecting the passage, an elongate plug in the chamber and concentric therewith and having a flow aperture through it, the plug being rotatable in the chamber to move the aperture into and out of register with the flow passage, a closure plate carried by the plug and shiftable relative thereto in a direction radial of the plug and also around the plug, and cam means operated by movement between the plug and plate in the last-mentioned direction shifting the plate radially of the plug and into sealing engagement with the wall of the chamber around the passage, the cam means including two cam faces of corresponding shape and engaged one with the other throughout an area substantially equal to the cross-sectional area of the passage and in register therewith when the plate is sealed with the said wall, one cam face being on the plug and the other being on the plate.

JOSEPH HEINEN.

REFERENCES CITED

The following references are of record in the file of this patent:

UNITED STATES PATENTS

| Number | Name | Date |
|---|---|---|
| 330,800 | Pattee | Nov. 17, 1885 |
| 709,146 | Erdman | Sept. 16, 1902 |
| 1,949,834 | Heggem | Mar. 6, 1934 |
| 1,951,878 | Lundgren | Mar. 20, 1934 |
| 2,114,066 | Wynkoop | Apr. 12, 1938 |
| 2,283,259 | Johnson | May 19, 1942 |
| 2,290,332 | Johnson | July 21, 1942 |

FOREIGN PATENTS

| Number | Country | Date |
|---|---|---|
| 399,092 | Germany | of 1924 |